United States Patent
Jung

Patent Number: 5,820,794
Date of Patent: Oct. 13, 1998

[54] MULTI-LAYER OPTICAL RECORDING MEDIUM MANUFACTURING METHOD

[75] Inventor: Seung-tae Jung, Sungnam, Rep. of Korea

[73] Assignee: Samsung Electronics Co., Ltd., Suwon, Rep. of Korea

[21] Appl. No.: 522,489

[22] Filed: Aug. 31, 1995

[30] Foreign Application Priority Data

Jan. 24, 1995 [KR] Rep. of Korea ............ 95-1223

[51] Int. Cl.⁶ ............ B29D 11/00; B29D 17/00
[52] U.S. Cl. ............ 264/1.33; 264/106; 425/810; 425/812
[58] Field of Search ............ 264/1.33, 1.7, 264/106, 107; 425/810, 812

[56] References Cited

U.S. PATENT DOCUMENTS

| | | | |
|---|---|---|---|
| 4,372,741 | 2/1983 | Cane et al. | 264/106 |
| 4,450,553 | 5/1984 | Holster et al. | |
| 4,898,529 | 2/1990 | Muchnik et al. | 264/106 |
| 5,126,996 | 6/1992 | Iida et al. | |
| 5,635,114 | 6/1997 | Hong | 264/1.33 |

FOREIGN PATENT DOCUMENTS

| | | |
|---|---|---|
| 60-237653 | 11/1985 | Japan. |
| 61-27815 | 6/1986 | Japan. |
| 1-276449 | 11/1989 | Japan. |
| 2-223030 | 9/1990 | Japan. |
| 3-293107 | 12/1991 | Japan. |
| 4-38733 | 2/1992 | Japan. |
| 4-339335 | 11/1992 | Japan. |

OTHER PUBLICATIONS

M. Ross, "Taking Optical Storage to Higher Levels," *IBM Research Magazine*, No. 2, 1994, pp. 14–17.

"3M Announces Dual–Layer Construction Process For High–Density DC–ROM," 3M News, Nov. 14, 1994 (3 pages).

*Primary Examiner*—Mathieu D. Vargot
*Attorney, Agent, or Firm*—Burns, Doane, Swecker & Mathis, L.L.P.

[57] ABSTRACT

A multi-layer optical recording medium manufacturing method and apparatus thereof forms a resin layer having a second recording layer on a first recording layer. The first recording layer includes a reflecting layer and a first recording layer sequentially formed on a transparent substrate. The multi-layer optical recording medium manufacturing apparatus includes an upper and a lower mold on which is respectively fixed the transparent substrate and a stamp such that they are facing each other. Communicating holes formed in the transparent substrate and the stamp are formed in center portions of each of the molds. A punch member capable of vertical movement is established in the communicating hole of the lower mold, and resin supply established in the communicating hole of the upper mold. The above apparatus has the advantage of improving productivity of the manufacture of a multi-layer optical recording medium.

6 Claims, 4 Drawing Sheets

MULTI-LAYER OPTICAL RECORDING MEDIUM MANUFACTURING METHOD

BACKGROUND OF THE INVENTION

The present invention relates to a manufacturing method and manufacturing apparatus for manufacturing an optical recording medium such as a video or compact disk, and more particularly, to a method of manufacturing a multi-layer optical recording medium and apparatus thereof.

A conventional optical recording medium, e. g., an optical disk, is generally made of a transparent resin material such as polymethylmethacrylate or polycarbonate. The optical disk has a structure including a transparent substrate. The substrate has a recording surface formed thereon in the form of pits in a predetermined pattern on its upper surface. A reflecting film of metal is formed by an evaporation process, such as sputtering, on the transparent substrate, and a protecting film is formed on the reflecting film. The pit pattern of the reflecting film and the transparent substrate is formed in a spiral shape.

The information recorded on the optical disk constructed as described above is read as optical information, namely, the pit pattern, reflected from the reflecting film by optical means.

However, the conventional optical disk structure has a drawback in that its capacity is insufficient for the storage of a large volume of information needed to reproduce voice information or picture Information.

Accordingly, a multi-layer recording medium structure is proposed as one method for possessing a greater capacity. A multi-layer optical recording and reproducing medium structure having reflecting layers with differing reflecting coefficients was initially proposed in 1979 (U.S. Pat. No. 4,450,563). A second type of multi-layer optical recording medium structure having silicon as a first reflecting layer and aluminum as a second reflecting layer was proposed in 1988 (U.S. Pat. No. 5,126,996).

One embodiment of such a multi-layer optical recording medium is shown in FIG. 1. It includes a first transparent substrate 11 made of an approximately 1 mm thick PVC plate, a first resin layer 12 providing first recording surface on the upper portion of transparent substrate 11, and a first reflecting film 13 formed on the upper surface of first resin layer 12. A resin layer 15 in which a second recording surface is formed, is made of an approximately 0.15 mm thick PVC plate and is formed on the upper portion of first reflecting film 13, and a second transparent substrate 18 having a second reflecting film 17 is formed on the upper portion of resin layer 15.

The conventional multi-layer optical recording medium constructed as above is composed of at least two reflecting layers constructed so as to have different reflecting coefficients. Here, the stronger the intensity of light reflected from first and second reflecting films 13 and 17, the easier it is to read the information stored. The ratio of incident light to reflecting light depends on the number of optical structures.

Since the information recording state depends on the precision of the microscopic pit formation in the multi-layer optical recording medium described above, a plurality of manufacturing methods to form a more precise pit pattern are proposed. Among these methods, the method of injecting resin between a stamp and the substrate in which the reflecting layer is formed, curing the resin, and forming the recording layer is disclosed in U.S. Pat. No. 5,171,392.

An other method similar to the above, as shown in FIG. 2, spreads the resin at a predetermined width on the upper surface of stamp 20 by using a nozzle 40. In this method, as shown in FIGS. 3 and 4, after a coupling resin layer 31 to a transparent substrate 30 on which a reflecting layer 32 is formed, they are joined to the stamp under pressure so that the resin interposed between stamp 20 and transparent substrate 30 spreads evenly between them. Light from a light source 25 irradiates the resin from transparent substrate 30 side to cure it and forms a resin layer 33 is formed. However, the above resin spreading method has the following problems.

First, since the space between the transparent substrate and the stamp, namely, the thickness of the resin layer, varies according to the pressure applied, it is hard to keep the space between the stamp and the transparent substrate constant .

Second, since it is difficult to adjust the amount of the resin supplied between the stamp and the transparent substrate, large amounts of the resin are lost.

Third, after the formation of the resin layer is finished, since the resin is effused between the stamp and the transparent substrate, an extra process is needed to remove the excess resin. This increases the production costs and lowers productivity.

Fourth, at the time of applying pressure to the stamp and the transparent substrate, the speed of the apparatus applying pressure accelerates, and hence the transcription rate is not uniform and the removal of air from the pits is not realized smoothly.

SUMMARY OF THE INVENTION

It is an object of the present invention to provide a multi-layer optical recording medium manufacturing method and apparatus thereof capable of improving precision in pit formation and improving productivity by reducing the number of manufacturing processes.

To accomplish the above object, there is provided a multi-layer optical recording medium manufacturing method forming a resin layer having a second recording layer on a first recording layer in which a reflecting layer and the first recording layer are sequentially formed on a transparent substrate, the method comprising the steps of: maintaining the transparent substrate on which the reflecting layer and the first recording layer are formed and the stamp having the second recording layer on its upper surface at a predetermined distance, facing each other; closing off temporarily one side of a central hole formed in the separated stamp and the transparent substrate and supplying the resin under pressure between the stamp and the transparent substrate through the open side of the central hole; and opening completely the central hole by removing the remaining resin after the resin supply step is finished.

To achieve the above object, there is provided a multi-layer optical recording medium manufacturing apparatus forming a resin layer having a second recording layer on a first recording layer in which a reflecting layer and the first recording layer are sequentially formed on a transparent substrate, the apparatus comprising: an upper mold and a lower mold established to face each other, fixing portions by which the transparent substrate and the stamp facing each other are fixed respectively, and a communicating hole communicating with the central hole of the transparent substrate and the stamp; a punch member capable of vertical movement established in a communicating hole in the lower mold; and resin supply means established in the communicating hole in the upper mold.

The multi-layer optical recording medium manufacturing apparatus further comprises resin leakage shutting off means for shutting off the leakage of the resin supplied from the resin supply means, on at least one edge of the upper and lower molds.

DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A multi-layer optical recording medium manufacturing method according to the present invention relates to a method for manufacturing a multi-layer optical recording medium having two or more recording layers. More particularly, the method is for forming a resin layer having a second recording layer on a first recording layer in which a reflecting layer and the first recording layer are sequentially formed on a transparent substrate.

Figure 1:
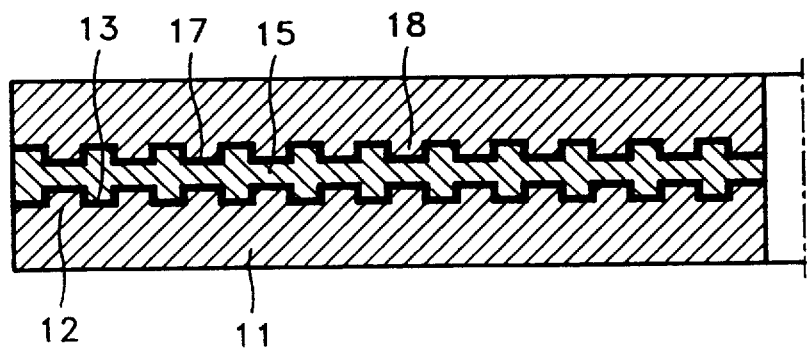
FIG. 1 is a partial cross section showing a conventional optical recording medium structure.
Figure 2:
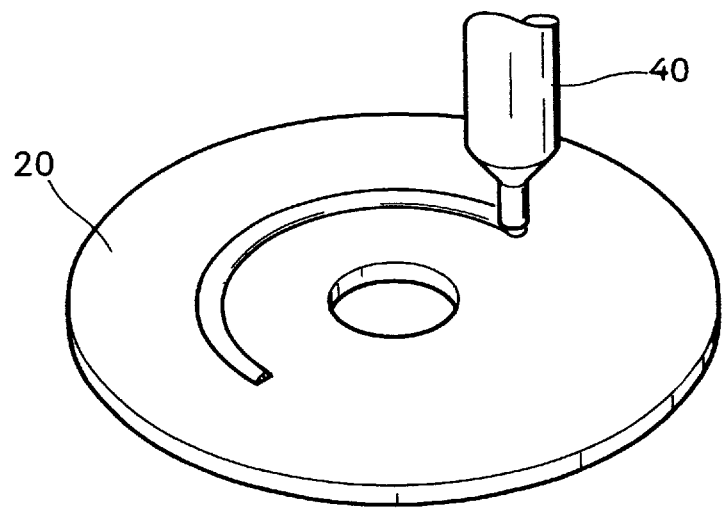
FIGS. 2 to 4 are drawings sequentially showing a method for forming a resin layer having a conventional second recording surface.
Figure 3:
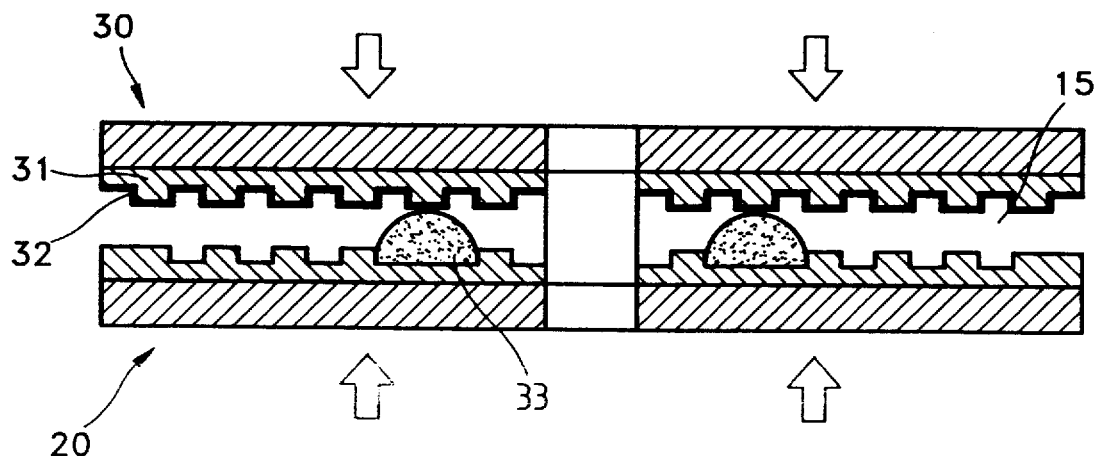
Figure 4:
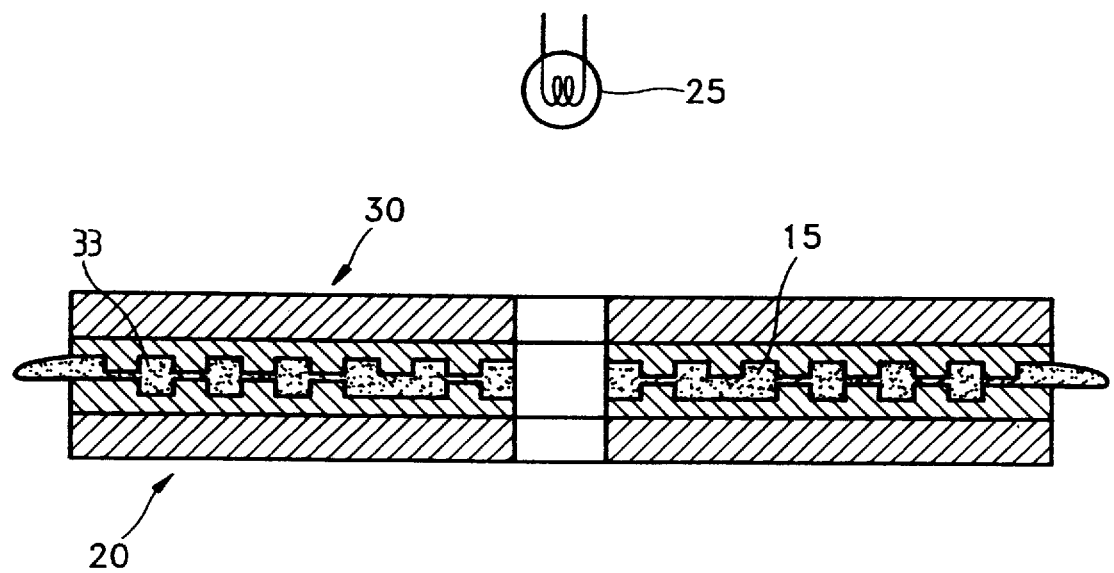
Figure 5:
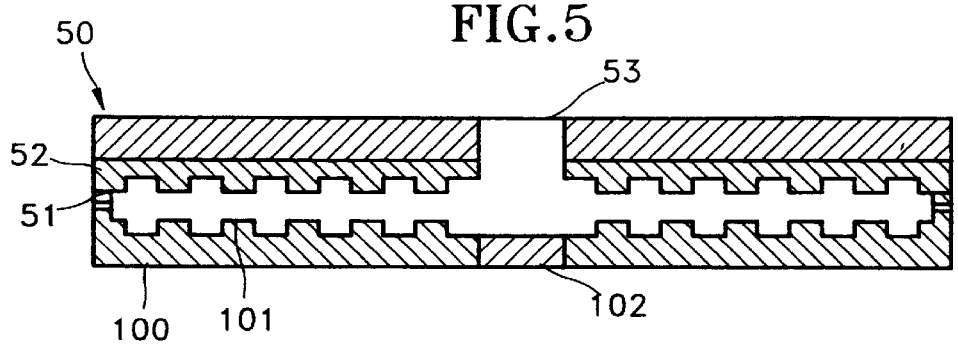
FIGS. 5 to 8 are cross sections showing a multi-layer optical recording medium manufacturing method according to the present invention.
Figure 6:
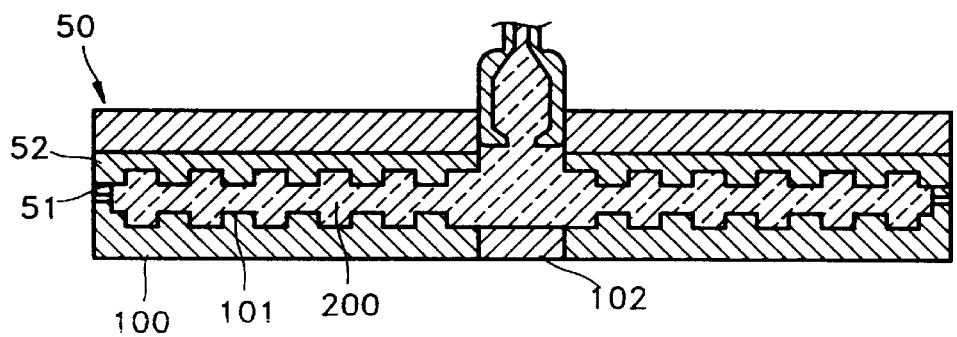

In order to form the resin layer on the transparent substrate, as shown in FIG. 5, a transparent substrate 50 on which a reflecting layer 51 and a first recording layer 52 are sequentially formed and a stamp 100 having a recording layer 101 on its upper surface are maintained at a predetermined distance spacing from each other. As shown in FIG. 6, one central hole 102 of the two central holes 53 and 102 (FIG. 7) formed in the center portion of transparent substrate 50 and stamp 100 is closed, and resin is supplied under pressure between first recording layer 52 on transparent substrate 50 and stamp 100 through a central hole 53 which is open. It is preferable that the space between the edges of first recording layer 52 on transparent substrate 50 and stamp 100 be closed when resin is supplied, and that the resin is not effused as far as this space.

Figure 7:
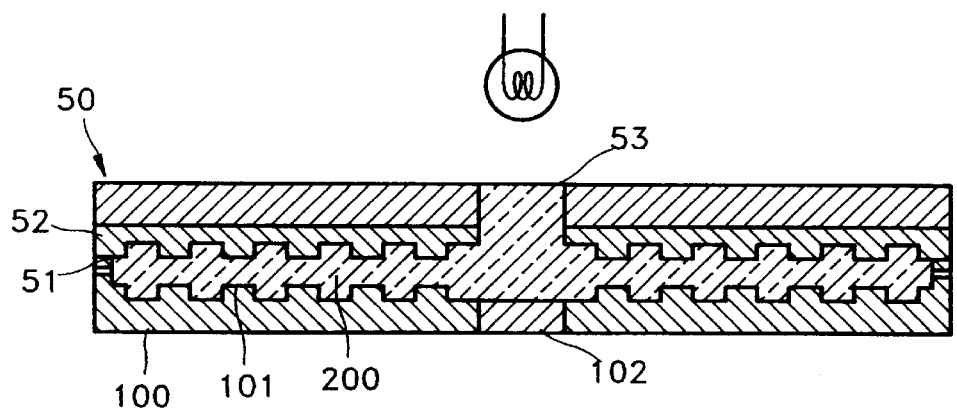
Figure 8:
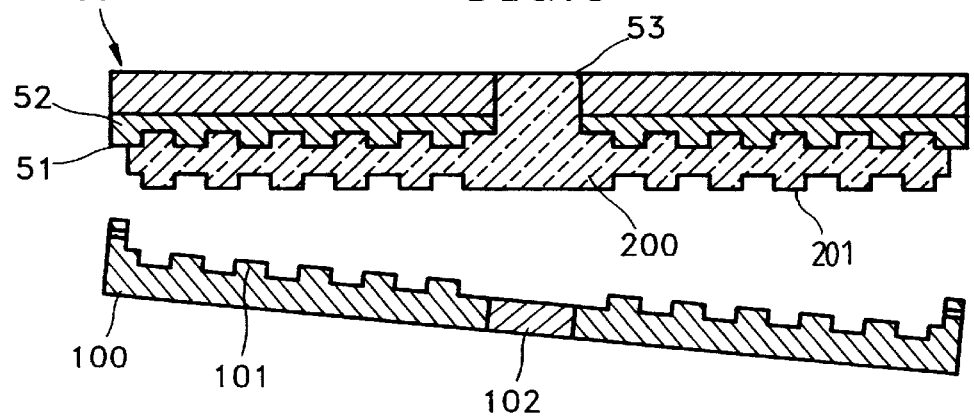

When the supply of the resin is finished, residual resin remaining on central holes 102 and 53 of transparent substrate 50 and stamp 100 is removed to completely open them. As shown in FIGS. 7 and 8, after ultraviolet rays irradiates a resin layer 200 interposed between stamp 100 and first recording layer 52 on transparent substrate 50 through the transparent substrate to cure the resin, transparent substrate 50, and a resin layer 200 formed on first recording layer 52 on transparent substrate 50, are separated from the stamp 100. The multi-layer optical recording medium manufacture method is finished by forming a reflecting film and a protection film on the free surface of the resin layer on which second recording layer 201 is formed.

As described in detail hereinabove, since the resin is pressurized and injected between transparent substrate 50 and stamp 100 when manufacturing the multi-layer optical recording medium, it is possible to greatly reduce the time for injection of the resin, and particularly to prevent permeation at air between transparent substrate 50 and resin layer 200. Also, the multi-layer optical recording medium having a plurality of resin layers comprised of recording layers can be manufactured by repeating the above method.

Figure 9:
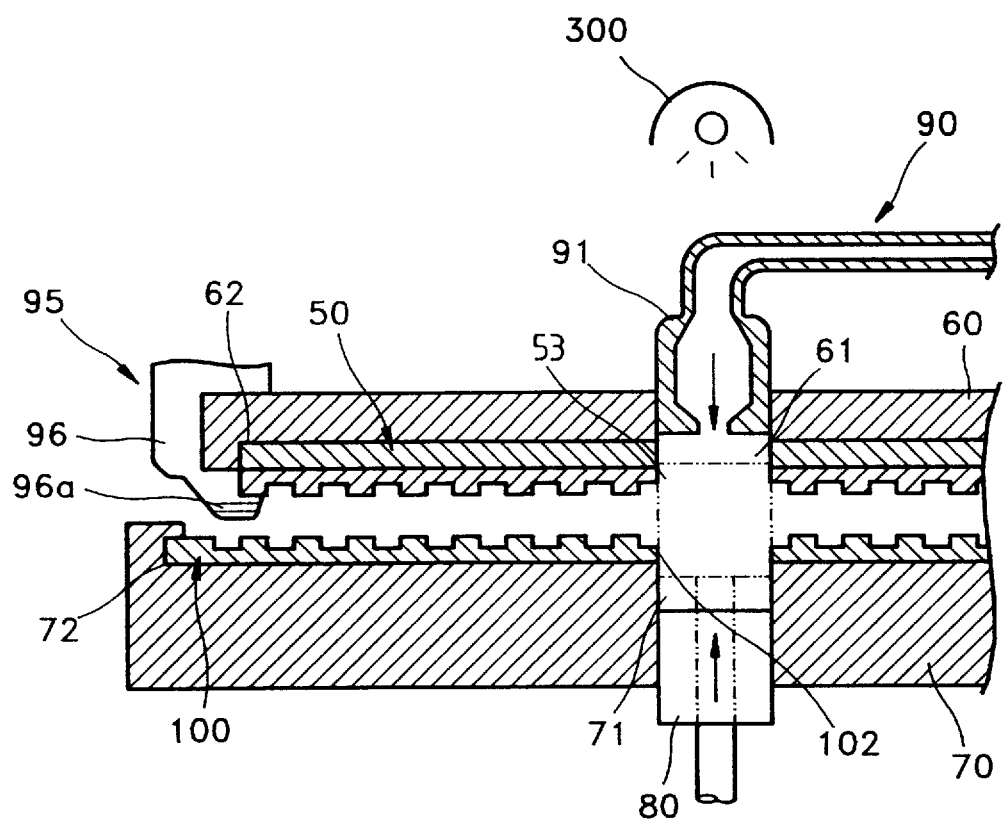
FIG. 9 is a partial cross section showing a multi-layer optical recording medium manufacturing apparatus according to the present invention.

The multi-layer optical recording medium manufacturing apparatus as shown in FIG. 9 for forming the resin layer on the transparent substrate includes: upper mold 60 and lower mold 70 are provided in which communicating holes 61 and 71 communicating with central holes 53 and 102 formed in transparent substrate 50 and stamp 100 are formed respectively on each center portion, and in which fixing portion 62 and 72 ensure transparent substrate 50 and stamp 100 which are established thereon facing each other, remain at a fixed distance; a punch member 80 provides with predetermined means for vertical movement established in communicating hole 71 of a lower mold 70; and resin supply means 90 established on communicating hole 61 of an upper mold 60.

Upper mold 60 which supports transparent substrate 50 on which reflecting layer 51 and first recording layer 52 are formed, is made of a transparent material such as crystal. Conventional fixing means (not shown) is provided for fixing portion 62 and 72 on upper mold 60 and lower mold 70 to vacuum-clamp and fix transparent substrate 50.

Punch member 80 formed in communicating hole 71 of lower mold 70 is established so as to have means for vertical movement such as cylinder. It is preferable that the top center point of punch member 80 is located at the opening of the communicating hole of upper mold 60, and bottom point is located in a central hole 102 of stamp 100. Also, it is preferable that the vertical movement means can detect the pressure of the resin supplied between stamp 100 and transparent substrate 50, and operates if the pressure of the resin is greater than a predetermined pressure.

Resin supply means 90 supplies molten resin between stamp 100 and transparent substrate 50, and provides nozzle 91 fixed to communicating hole 61 of upper mold 60.

Resin leakage shutting off means 95 which prevents leakage of the resin supplied between stamp 100 and transparent substrate 50 is further provided on the edge of upper mold 60 or lower mold 70. Resin leakage shutting off means 95 provides protruding portion 96 extended a predetermined length from the edge of upper mold 60 vertically downward, namely, toward lower mold 70, and hole 96a permitting effusion of air is formed on at least one side of protruding portion 96. Reference numeral 300 denotes a light source for curing the resin supplied between the transparent substrate and the stamp.

In order to form resin layer 200 having the second recording surface on the upper surface of transparent substrate 50 on which reflecting layer 51 and first recording layer 52 are formed by using the multi-layer optical recording medium manufacturing apparatus according to the present invention constructed above, transparent substrate 50 is fixed to fixing portion 62 of upper mold 60, and stamp 100 is fixed to fixing portion 72 of lower mold 70. Transparent substrate 50 and stamp 100 are maintained at a predetermined distance by coupling upper mold 60 to lower mold 70. At this time, the end portion of punch member 80 is located inside communicating hole 71. The resin is supplied between transparent substrate 50 and stamp 100 through a nozzle 91 of resin supply means 90. On termination of resin supply, the resin located on the edge of transparent substrate 50 is not effused past this edge due to protruding portion 96 of resin leakage shutting off means 95. When supply of the resin is finished, the pressure between transparent substrate 50 and stamp 100 rises, punch member 80 then operates rising to push resin located in central holes 53 and 102 of stamp 100 and transparent substrate 50 back into nozzle 91. Light, namely, ultraviolet rays from a light source 300 established on the upper portion of the upper mold irradiate resin to cure it. Upper mold 60 and lower mold 70 then separate, and stamp 100 and resin layer 200 on which second recording layer 201 is formed are separated. Finally, transparent substrate 50 is separated from upper mold 60.

If the reflecting layer, the first recording layer, and the resin layer on which the second recording layer is formed, are sequentially formed on the transparent substrate by using the multi-layer optical recording medium manufacturing apparatus described above, the following effects are attained.

Firstly, by maintaining the stamp and the transparent substrate supported on the upper and lower mold at a predetermined distance from each other, it is possible to maintain a uniform thickness of the resin layer on which the second recording layer is formed.

Secondly, it is possible to prevent the generation of edge burrs, since the resin is protruded only to the edge of the transparent substrate.

Thirdly, the transcription rate is raised due to the improved adhesion of the respective layers formed on the transparent substrate.

Finally, it is possible to improve productivity by reducing the time taken to form the resin layer.

In the present invention, the multi-layer optical recording medium manufacturing method and apparatus thereof were explained using one example of a two-layer optical recording medium, but the technical idea of the present invention is not limited to the above example, and of course, can be applied to structures of more than two layers. The present invention is not limited to the above embodiment, many modifications can be made within the technical idea to which the present invention belongs, by those of ordinary skill in the art.

What is claimed is:

1. A multi-layer optical recording medium manufacturing method forming a resin layer having a second recording layer on a first recording layer in which a reflecting layer and the first recording layer are sequentially formed on a transparent substrate, said method comprising the steps of:

(a) maintaining at a predetermined distance from each other said transparent substrate having said reflecting layer and said first recording layer formed thereon, and a stamp having a pattern for a recording layer on the upper surface of the stamp;

(b) closing one of the two central holes respectively formed in said stamp and said transparent substrate and supplying resin under pressure between said stamp and said transparent substrate through the other central hole;

(c) removing the resin remaining in the central hole after supply of said resin is finished; and (d) curing only the resin supplied between said first recording layer on the transparent substrate and said stamp.

2. A multi-layer optical recording medium manufacturing method according to claim 1, further comprising the step of repetitively applying the above steps (a) through (d) on the formed resin layer instead of the transparent substrate to sequentially form a plurality of resin layers having the other recording layers on the formed resin layer.

3. A multi-layer optical recording medium manufacturing method according to claim 1, further comprising the step of preventing leakage of the resin at at least one edge of said transparent substrate and said stamp.

4. A multi-layer optical recording medium manufacturing method according to claim 1, further comprising the step of irradiating an upper portion of said transparent substrate with light and curing the resin.

5. A multi-layer optical recording medium manufacturing method according to claim 1, further comprising the step of providing a resin leakage shutting off means including a protruding portion extended vertical downward from an edge of an upper mold.

6. A multi-layer optical recording medium manufacturing method according to claim 5, further comprising the step of providing a hole through which air is expelled in said protruding portion of said resin leakage shutting off means.

* * * * *